United States Patent
Kelly et al.

(10) Patent No.: US 8,041,960 B2
(45) Date of Patent: Oct. 18, 2011

(54) SECURE CREATION AND MANAGEMENT OF DEVICE OWNERSHIP KEYS

(75) Inventors: Scott G. Kelly, Santa Clara, CA (US); Shekhar Kshirsagar, San Jose, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 742 days.

(21) Appl. No.: 12/109,273

(22) Filed: Apr. 24, 2008

(65) Prior Publication Data
US 2009/0268915 A1   Oct. 29, 2009

(51) Int. Cl.
*H04L 9/32* (2006.01)
(52) U.S. Cl. ........................................ 713/193
(58) Field of Classification Search .............. 380/282, 380/279; 713/164, 193, 194
See application file for complete search history.

(56) References Cited

U.S. PATENT DOCUMENTS

| 2005/0044404 | A1* | 2/2005 | Bhansali et al. | 713/200 |
| 2005/0166051 | A1* | 7/2005 | Buer | 713/173 |
| 2005/0235141 | A1* | 10/2005 | Ibrahim et al. | 713/164 |
| 2008/0152151 | A1* | 6/2008 | Pourzandi et al. | 380/286 |

OTHER PUBLICATIONS

"TPM Main Part 1 Design Principles", TCG Published, Jul. 9, 2007, 1-182, Specification Version 1.2, Level 2 Revision 103.
"TPM Main Part 2 TPM Structures", TCG Published, Jul. 9, 2007, 1-198, Specification Version 1.2, Level 2 Revision 103.
"TPM Main Part 3 Commands", TCG Published, Jul. 9, 2007, 1-330, Specification Version 1.2, Level 2 Revision 103.

* cited by examiner

*Primary Examiner* — Ellen Tran
(74) *Attorney, Agent, or Firm* — Blakely, Sokoloff, Taylor & Zafman LLP

(57) ABSTRACT

Secure creation and management of device ownership keys. TPM ownership keys are generated by cryptographically combining manufacturer information with device specific information. Ownership keys are established in the TPM containing device. The manufacturer retains necessary information to reconstruct the ownership key if needed.

20 Claims, 2 Drawing Sheets

SECURE CREATION AND MANAGEMENT OF DEVICE OWNERSHIP KEYS

BACKGROUND OF THE INVENTION

The present invention relates to device ownership keys, and to the creation and management of device ownership keys in Trusted Platform Modules.

A Trusted Platform Module (TPM) is a special purpose digital microprocessor-based module which offers facilities for the secure generation of cryptographic keys in the non-volatile memory of the TPM, and other capabilities such as remote attestation and sealed storage. These facilities may be used, for example, to authenticate computing systems. TPMs are specified by the Trusted Computing Group (http://trustedcomputinggroup.org); the specification at the time of this application is Version 1.2 Revision 103, published Jul. 9, 2007, and incorporated herein by reference. TPMs are produced by companies such as Atmel, Broadcom, Infineon, AMT, and ST Microelectonics, among others.

Trusted Platform Modules (TPMs) require the creation and management of an "owner" key in order to provide these and other security functions. In general terms, the owner key forms the root of a cryptographic key hierarchy, but it is keys lower in this hierarchy that are typically used for day to day activities. Hence, it is entirely possible that for some use cases, an owner key, once used to create the key hierarchy that lays beneath it, may be set aside and not used for further operations.

In currently shipping laptop computers and other consumer devices containing TPMs, the purchaser of the device is typically expected to "take ownership", generating an "owner key" in the process, and to provide for the secure management and use of that key. However, this is a complex undertaking that requires significant security expertise and planning to perform correctly, and there currently are very few convenient tools available for this purpose. The net effect is that many TPMs exist in consumer devices today, but, owing to the complexities involved, few are actually being used.

In the case of an embedded device such as network controller or access node, it is not strictly necessary that the customer purchasing the device be aware of the TPM and concepts such as TPM ownership in order to reap many of the advantages it provides. That is, ownership operations can be pre-programmed at some point (e.g. during manufacturing), and the TPM can be entirely operated by the system software/firmware on the device, with no customer interaction. This model also extends quite readily to centralized management of laptop and desktop computers containing TPMs.

If in such cases the owner key were to reside on the device, there is a risk that device compromise could result in loss of legitimate TPM ownership, and this could, in turn, lead to loss of control of the device. This is potentially very serious. However, since the owner key is not typically required for day to day operations, this key may be eliminated from the device once the underlying key hierarchy has been generated, so long as it is possible to restore the owner key in those rare cases where a very advanced customer might want to reset the TPM, and derive their own owner key hierarchy.

Taking such an approach entails the following requirements:

Each device should have a unique owner key; that is, the probability of any two devices having the same owner key should be very close to zero. Owner keys should be unpredictable.

Guessing the owner key should be impractical, i.e. the probability of guessing an owner key within the useful lifetime of the device, say 20 years, should be very close to zero.

The device manufacturer should be able to derive the owner key for any given device, should this ever become necessary.

It should be highly unlikely for the device manufacturer to "lose" the owner key for any device, although the net cost of such a loss would be the cost of replacement of the affected device.

It should not be possible for an adversary to obtain a single data value that, once compromised, would permit derivation of arbitrary owner storage keys; put differently, owner keys should be derived based on multiple factors, raising the bar against a process compromise leading to exposure of all owner keys.

It should be possible to provide advanced customers with owner keys for their own devices, so that they can reset the devices and derive their own (secret) owner keys if desired.

What is needed is a process for creating and managing TPM device ownership keys which addresses these requirements.

BRIEF DESCRIPTION OF THE DRAWINGS

The invention may be best understood by referring to the following description and accompanying drawings that are used to illustrate embodiments of the invention in which.

DETAILED DESCRIPTION

Embodiments of the invention relate methods of creating and managing device ownership keys for use with Trusted Platform Modules (TPMs).

In understanding the invention, the following definitions may be useful:

Target Device: the device for which the owner key is generated

Ownership Recovery Database: the backend database containing owner key recovery information Key Manager: the backend process responsible for generating and managing owner key and related quantities Key Generation Process: the process by which the owner key is created and distributed Nonce: an unpredictable numeric quantity used in the key generation process Model Key: for each device module (e.g. A3200), there is a unique secret key which is used as an input to the key generation process Model Key ID: to limit the window of exposure (should a model key be compromised), model keys may be changed from time to time. Thus, each model key must have a unique identifier, e.g. "A3200-00001"

Owner Key: the target device owner key

Key Manager Public Key: the public RSA key of the key manager

Key Manager Private Key: the private RSA key of the key manager

Figure 1:
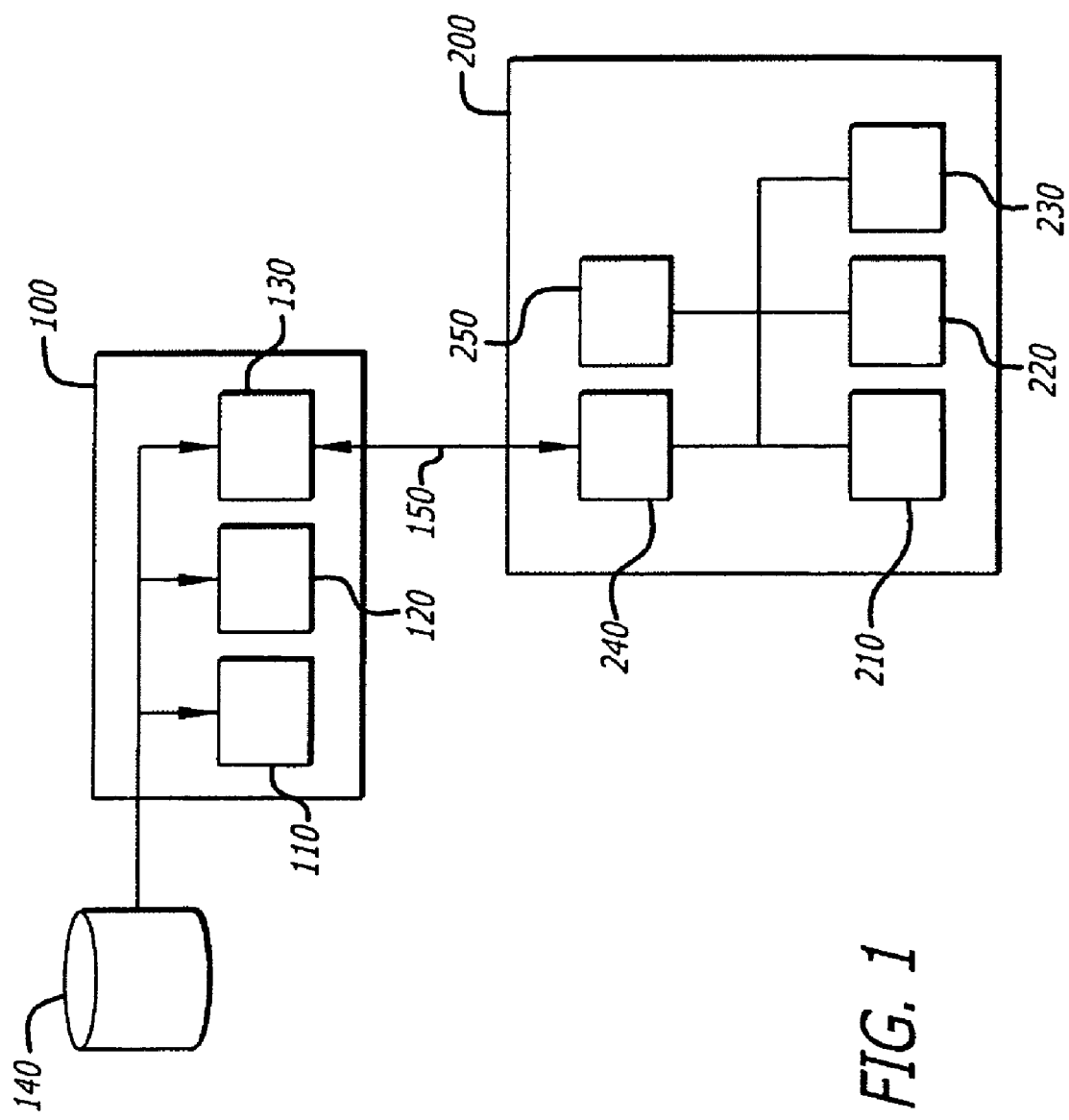
FIG. 1 shows a block diagram of an electronic system.

Key Recovery Token: Model Key ID and nonce concatenated and encrypted with Key Manager Public Key According to the present invention and as shown in FIG. 1 and the descriptions following, Key Manager 100 combines manufacturer information with device specific information to form an owner key, which is sent to the device, and a key recovery token, which is retained by the manufacturer and which may be used, in combination with device specific information, to recover the owner key. Cryptographic processes are used to combine information and form the keys. In one embodiment, device specific information may include device model, device serial number, and/or device base MAC address for network enabled devices. The owner key is sent to target device 200 and used to take ownership of Trusted Platform Module (TPM) 220. The recovery token is similarly sent to target device 200, and may be stored in TPM 220.

Key Manager 100 is a computer system or process driving the creation and transfer of ownership and recovery keys. Key manager 100 comprises CPU 110, memory hierarchy 120, and an interface 130 for communicating with target device 200. As is known to the art, memory hierarchy 120 comprises non-volatile and volatile memory devices used to hold programs and data required to operate the system. Key manager 100 communicates with database 140, which may be a disk drive local to key manager 100, or a network-connected database server.

Target device 200 is a device containing TPM 220. Device 200 operates under control of CPU 210, which communicates to memory hierarchy 230, I/O interfaces 250, communications port 240, and TPM 220. As is known to the art, memory hierarchy 230 comprises non-volatile and volatile memory devices used to hold programs and data for device operation. Communications port 240 is used to communications 150 with key manager 100. Port 240 may be a standard port or channel in the target device, such as an Ethernet port, serial port, or the like, or it may be a port dedicated to the manufacturing process, such as a port internal to the device. Target device CPU 210 communicates with TPM 220 through a TPM communication bus. As an example, manufacturers such as Atmel and Infineon provide TPMs which use the well known Low Pin Count (LPC) bus. TPM 220 responds to commands as defined in the TPM Specification, Part 3 Commands, incorporated herein by reference.

In operation according to the present invention, key manager 100 communicates 150 with device 200, which results in commands being sent to TPM 220.

Figure 2:
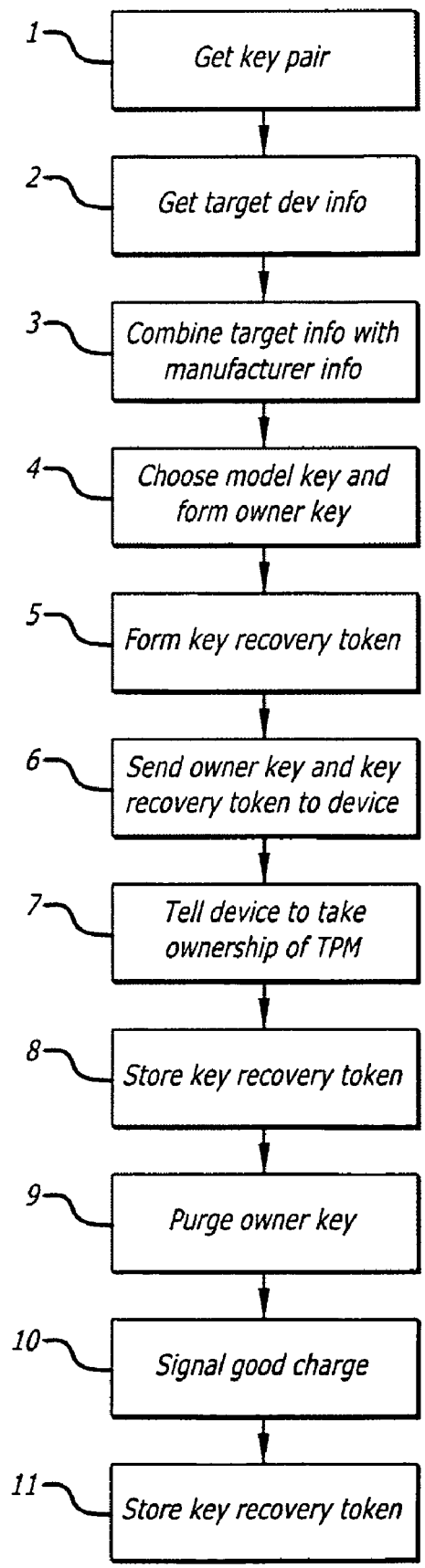
FIG. 2. shows a flowchart of an embodiment of the invention.

According to the present invention, device ownership and recovery keys are generated and transferred to the device according to the following procedure, as illustrated in FIG. 2.

1. Key Manager 100 makes use of a preexisting public/private key pair; the private key is safely stored offline, key manager 100 is in possession of the key manager public key 2. Target device 200 provides unique inputs to key manager 100, for example in the case of a network-enabled device, the device model, base MAC address and device serial number may be used.

3. Key manager 100 generates hash data based on the device identification combined with manufacturer information to form an intermediate value. As an example, key manager 100 may generate a nonce as he manufacturer information, and concatenate the device MAC address, serial number, and nonce into a contiguous string of octets.

4. Key manager 100 chooses the model key corresponding to device model and computes a hash of the intermediate value, for example HMAC_SHA256(model key, intermediate value), and assigns 160 bits of the output to the owner key. In one embodiment, the first 160 bits of the output are used as the owner key.

5. Key manager 100 concatenates Model Key ID and nonce and encrypts with Key Manager Public Key; the resulting value is the key recovery token. Optionally, if the concatenated Model Key ID and nonce are shorter than the length of the public key, it may be useful to pad this intermediate result to at least the same length as the public key. One method of padding is according to the PKCS #1 v1.5 algorithm.

6. Key manager 100 sends owner key and key recovery token to device 200.

7. Device 200 clears TPM, takes ownership with new owner key by issuing the TPM_TakeOwnership command with the new owner key. The new owner key will be required for future device operations using the TPM.

8. While the recovery token may be stored in memory 230, it is preferably stored in TPM 220. Device 200 stores key recovery token in non-volatile memory of TPM 220 for safekeeping; this is redundant, as key manager 100 also maintains a copy of the key recovery token.

9. Good security practice suggests that device 200 purge the owner key from device memory. While this step could be omitted if the owner key (and copies) were only maintained in volatile memory, and the device is powered off later in the process, good security practice suggests that the owner key be actively purged from device memory, such as by writing over it.

10. Device 200 notifies Key manager 100 of successful owner key change.

11. Key manager 100 stores transaction information (including device identification, in this example MAC and serial number), and key recovery token in ownership recovery database 140.

While the invention has been described in terms of various embodiments, the invention should not be limited to only those embodiments described, but can be practiced with modification and alteration within the spirit and scope of the appended claims. The description is this to be regarded as illustrative rather than limiting.

We claim:

1. A method of generating an ownership key for a target device containing a Trusted Platform Module (TPM) by a Key Manager comprising:
    combining manufacturer information with target device specific information to generate an owner key and a recovery token, the recovery token being based on information used to generate the owner key;
    sending the owner key to the target device;
    commanding the target device to use the owner key to take ownership of the TPM;
    sending the key recovery token to the target device and storing the key recovery token in the target device; and
    storing transaction information and the key recovery token in an ownership recovery database.

2. The method of claim 1 where the generating of the owner key and the recovery token is a cryptographic process.

3. The method of claim 1 where the generating of the; owner key and the recovery token further comprises:
    hashing the target device specific information concatenated with manufacturer information to form an intermediate value;
    choosing a model key corresponding to the target device;
    hashing the intermediate value with the model key to form an output value;
    selecting the owner key from the output value; and
    generating a key recovery token from the model key.

4. The method of claim 3 where the manufacturer information includes a nonce.

5. The method of claim 3 where the target device specific information includes one or more of the device model, device MAC address, and/or the target device serial number.

6. The method of claim 3 where the generating of the key recovery token comprises encrypting the concatenation of a Model Key ID being a unique identifier included in the Model key and a nonce being at least part of the manufacturer information using a public key of the Key Manager.

7. The method of claim 6 further comprising padding the concatenation of the Model Key ID and the nonce to the same length as the public key.

8. The method of claim 1 where the key recovery token is stored in the target device.

9. The method of claim 1 where the key recovery token is stored in the target device TPM.

10. The method of claim 9 further comprising purging the owner key from a target device memory after storing the key recovery token in the TPM.

11. The method of claim 1 further comprising having the target device notify the Key Manager of a successful owner key change after the step of taking ownership of the TPM using the owner key.

12. The method of claim 9 further comprising having the target device notify the Key Manager of a successful owner key change after the step of storing the key recovery token in the TPM.

13. A non-transitory machine readable medium having a set of instructions stored therein, which when executed on a system comprising a key manager connected to a target device containing a TPM causes a set of operations to be performed comprising:
   hashing target device specific information concatenated with manufacturer information to form an intermediary value,
   choosing a model key corresponding to the target device;
   hashing the intermediate value with the model key to form an output value;
   selecting the owner key from the output value;
   generating a key recovery token from the model key;
   sending the owner key to the target device;
   commanding the target device to use the owner key to take ownership of the TPM;
   sending the key recovery token to the target device and storing the key recovery token in the target device; and
   storing transaction information and the key recovery token in an ownership recovery database.

14. A method of generating an owner key for a target device containing a Trusted Platform Module (TPM) by a Key Manager, the method comprising:
   performing operations on manufacturer information and identification information for the target device to an intermediary result;
   performing operations on the intermediary result and keying material to generate an owner key, the owner key to be needed for future operations using the TPM;
   performing operations on a unique identifier located in the keying material to generate a key recovery token;
   transmitting the owner key and the key recovery token to the target device that results in the target device issuing a command to securely store and utilize the owner key;
   receiving information from the target device that the owner key has been successfully changed; and
   transmitting the identification information and the key recovery token in an external storage device upon receiving the information from the target device that the owner key has been successfully changed.

15. The method of claim 14 where the performing of the operations on the manufacturer information and the identification information includes performing a hash operation on the manufacturer information and the identification information to produce the intermediary result being a first hash value.

16. The method of claim 15 where the manufacturer information is a nonce generated by the Key Manager.

17. The method of claim 15 where the identification information is either a device Media Access Control (MAC) address or a serial number.

18. The method of claim 15 where the performing of the operations on the intermediary result and the keying material to generate the owner key includes performing a hash operation on the intermediary result and the keying material to produce a second hash value, a predetermined number of bits of the second hash value being used as the owner key.

19. The method of claim 18 where the keying material is a unique key associated with the target device and the predetermined number of bits being lesser in number than a number of bits forming the second hash value.

20. The method of claim 16 where the performing of the operations on the unique identifier located in the keying material to generate the key recovery token includes concatenating the unique identifier being part of the unique key and the nonce and encrypting a combination of the unique identifier and the nonce with a public key of the Key Manager to produce the key recovery token.

* * * * *